United States Patent
Collins et al.

(10) Patent No.: US 11,693,468 B2
(45) Date of Patent: Jul. 4, 2023

(54) POWER SETTING ADJUSTMENT IN RESTRICTED AIRFLOW ENVIRONMENT

(71) Applicant: Lenovo (Singapore) Pte. Ltd., Singapore (SG)

(72) Inventors: Sandy Collins, Durham, NC (US); Justin M Ringuette, Morrisville, NC (US); Mark K Summerville, Apex, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 17/522,090

(22) Filed: Nov. 9, 2021

(65) Prior Publication Data

US 2023/0141564 A1 May 11, 2023

(51) Int. Cl.
*G06F 1/3206* (2019.01)
*G06F 1/16* (2006.01)
*G06F 1/20* (2006.01)
*G06F 1/3234* (2019.01)

(52) U.S. Cl.
CPC .......... *G06F 1/3206* (2013.01); *G06F 1/1616* (2013.01); *G06F 1/206* (2013.01); *G06F 1/3234* (2013.01)

(58) Field of Classification Search
CPC ...... G06F 1/3206; G06F 1/1616; G06F 1/206; G06F 1/3234
See application file for complete search history.

(56) References Cited

U.S. PATENT DOCUMENTS

| | | | |
|---|---|---|---|
| 6,029,119 A * | 2/2000 | Atkinson | G06F 1/206 702/132 |
| 2003/0220721 A1 * | 11/2003 | Cohen | G06F 1/3203 700/301 |
| 2006/0192770 A1 * | 8/2006 | Suzukawa | G06F 1/1677 345/173 |
| 2007/0050473 A1 * | 3/2007 | Lee | G06F 1/3203 709/217 |
| 2009/0099696 A1 * | 4/2009 | Artman | H05K 7/20209 454/239 |
| 2009/0190625 A1 * | 7/2009 | Chung | G06F 1/206 415/118 |
| 2012/0130545 A1 * | 5/2012 | Haugh | G06F 1/3203 700/276 |
| 2012/0241140 A1 * | 9/2012 | MacDonald | G06F 1/206 165/278 |
| 2016/0227675 A1 * | 8/2016 | North | H05K 7/20181 |
| 2017/0312614 A1 * | 11/2017 | Tran | G06F 3/00 |
| 2017/0374760 A1 * | 12/2017 | Chen | G06F 1/206 |
| 2019/0235982 A1 * | 8/2019 | North | G06F 1/203 |
| 2019/0239384 A1 * | 8/2019 | North | G06F 1/3296 |
| 2020/0333861 A1 * | 10/2020 | Seyed | G06F 1/203 |

* cited by examiner

*Primary Examiner* — Gary Collins
(74) *Attorney, Agent, or Firm* — Ference & Associates LLC

(57) ABSTRACT

One embodiment provides a method, including: detecting, based on at least one metric, that an information handling device is experiencing a restricted airflow condition; decreasing, responsive to the detecting, a system power setting of the information handling device during a duration of the restricted airflow condition; and restoring, subsequent to detecting that the information handling device is no longer experiencing the restricted airflow condition; the system power setting. Other aspects are described and claimed.

20 Claims, 3 Drawing Sheets

POWER SETTING ADJUSTMENT IN RESTRICTED AIRFLOW ENVIRONMENT

BACKGROUND

Individuals may utilize their mobile information handling devices ("devices"), for example laptops, hybrid devices, smart phones, tablets, and the like, to accomplish a variety of different tasks. For example, users may utilize their devices to create documents or files, browse websites, capture images or videos, stream media content, and the like. Due to the mobile nature of these devices, users can easily transport (e.g., in a bag, in a user's pocket, etc.) and interact with them in many different places.

BRIEF SUMMARY

In summary, one aspect provides a method, including: detecting, based on at least one metric, that an information handling device is experiencing a restricted airflow condition; decreasing, responsive to the detecting, a system power setting of the information handling device during a duration of the restricted airflow condition; and restoring, subsequent to detecting that the information handling device is no longer experiencing the restricted airflow condition; the system power setting.

Another aspect provides an information handling device, including: a processor; a memory device that stores instructions executable by the processor to: detect, based on at least one metric, that an information handling device is experiencing a restricted airflow condition; decrease, responsive to the detecting, a system power setting of the information handling device during a duration of the restricted airflow condition; and restore, subsequent to detecting that the information handling device is no longer experiencing the restricted airflow condition; the system power setting.

A further aspect provides a product, including: a storage device that stores code, the code being executable by a processor and comprising: code that detects, based on at least one metric, that an information handling device is experiencing a restricted airflow condition; code that decreases, responsive to the code that detects, a system power setting of the information handling device during a duration of the restricted airflow condition; and code that restores, subsequent to the code that detects that the information handling device is no longer experiencing the restricted airflow condition; the system power setting.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
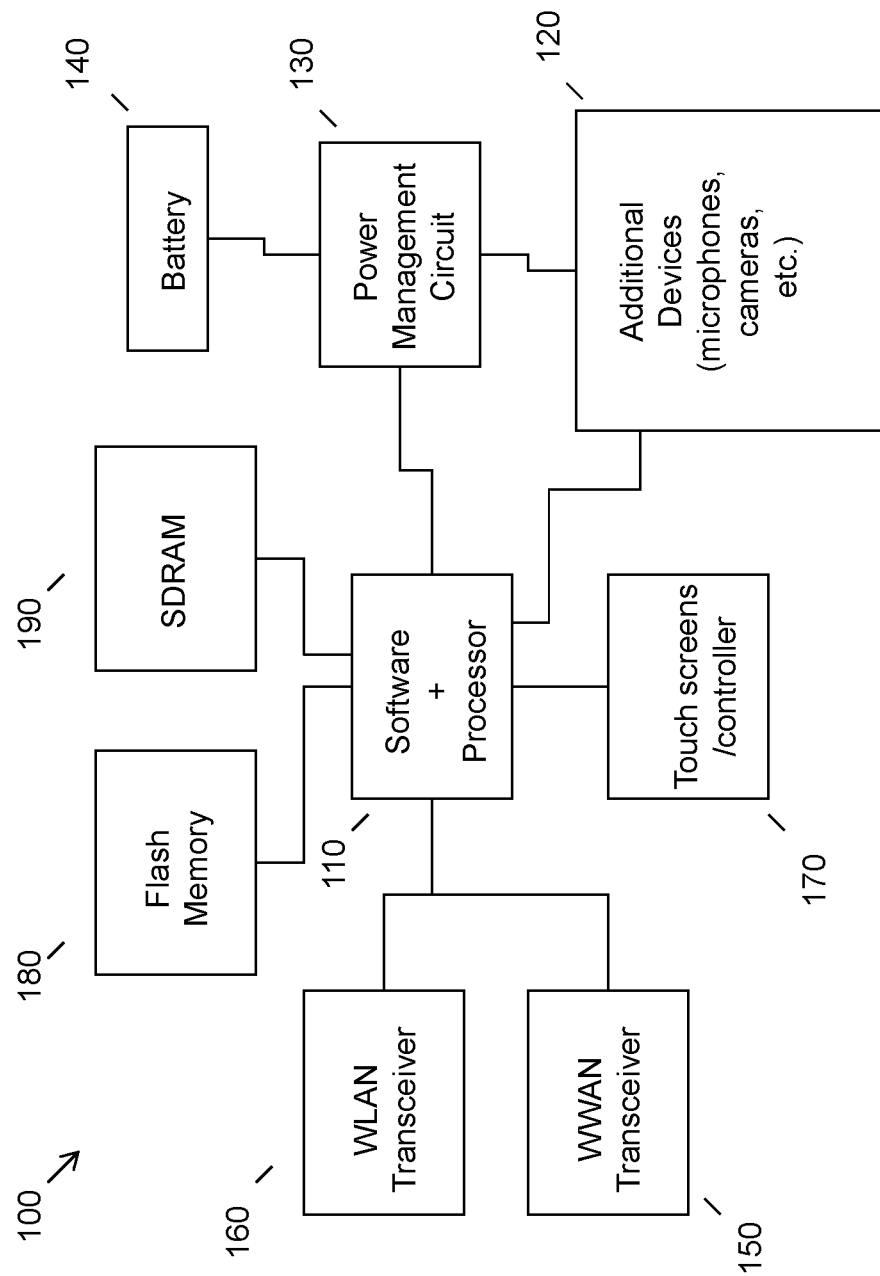
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When transported, mobile devices are often placed into an enclosed area such as a bag/case (e.g., for laptops, tablets, hybrid devices, etc.) or in a user's pocket (e.g., for a mobile phone or other small mobile device, etc.). In these environments, mobile devices may heat to uncomfortable temperatures due to restricted airflow. Device overheating may negatively affect system performance and/or potentially damage device hardware.

One conventional solution to the foregoing issue is to implement an absolute thermal limit for the device. More particularly, the thermal limit may ensure that a device maintains a certain operating temperature range irrespective of external conditions (e.g., such as airflow, usage location or position, etc.). To operate within the designated temperature range established by the thermal limit, a system's functionality is generally reduced (e.g., various device functions and/or capabilities are disabled, etc.). Although beneficial for preventing overheating, the utilization of absolute thermal limits may ultimately sacrifice overall system performance. For example, if a device is tuned well to operate in a bag environment, removal of the device from the bag to a more optimal usage environment (i.e., to a better airflow condition) will not increase its performance.

Another solution involves motion-based thermal throttling. Such a solution may utilize one or more types of motion sensors integrated into a device (e.g., accelerometers, etc.) to determine whether the device is moving or not. Responsive to determining that the device is undergoing motion (e.g., resulting from being carried, etc.) then system operation may access a dedicated thermal table for that context and adjust system settings accordingly. A primary issue with this solution is that it would not address situations where a device is operating in a stationary reduced airflow environment (e.g., a device is positioned in a bag that is laying on a table, etc.).

Accordingly, an embodiment provides a method for decreasing a system power setting in response to a detecting that the device is in a restricted airflow context. In an embodiment, a device may be detected to be experiencing a restricted airflow condition. Such detection may involve utilizing one or more data metrics available to the device (e.g., lid position data, edge orientation data, cover compression data, and/or motion-sensing data). Responsive to this detection, an embodiment may then decrease a system power setting of the device during a duration of the restricted airflow condition. Subsequent to detecting that the device is no longer experiencing the restricted airflow condition, an embodiment may restore the system power setting. Such a method may ensure that a device operating in an enclosed environment does not overheat and/or experience damage.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
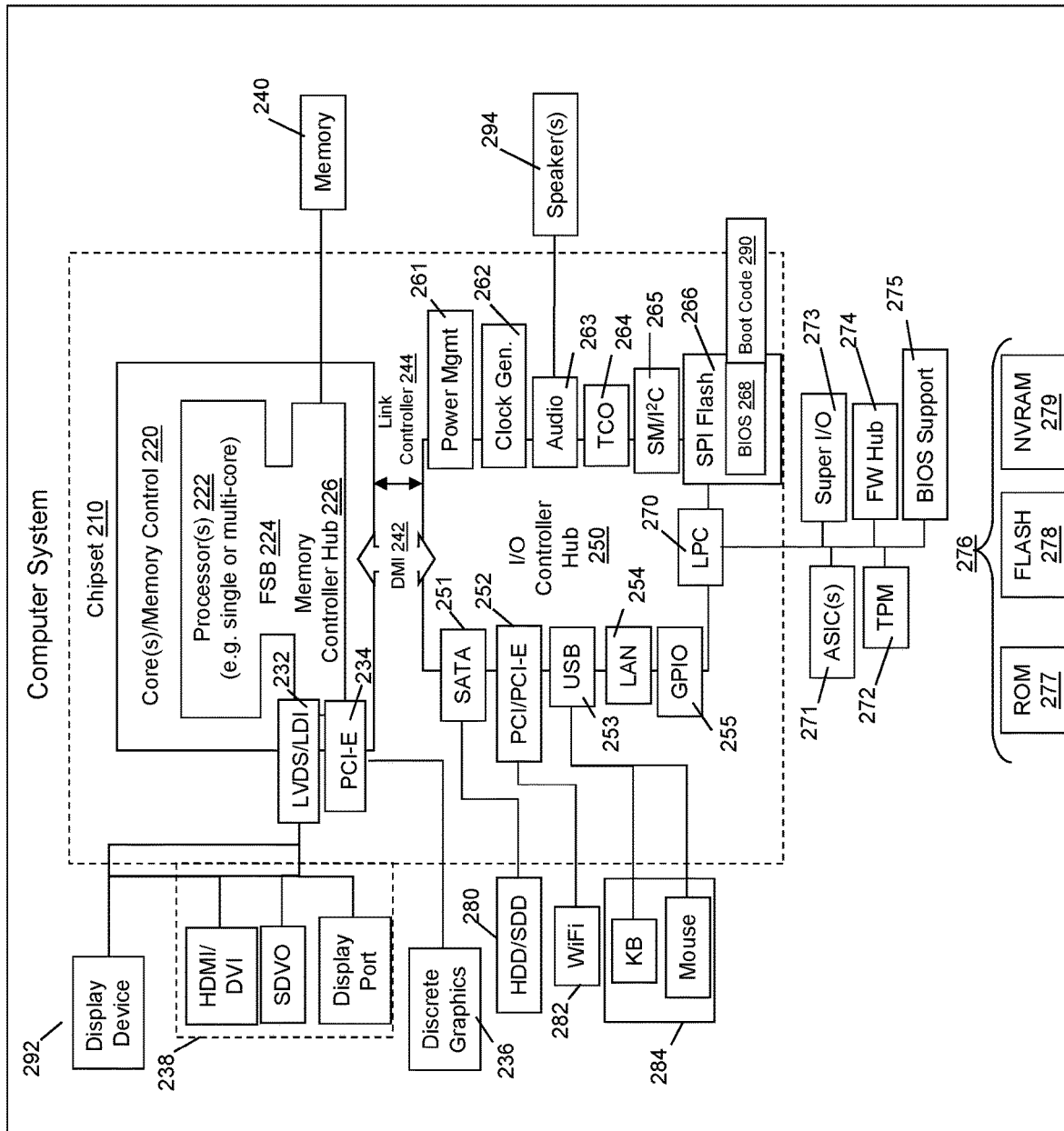
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in computing devices that are mobile. For example, the circuitry outlined in FIG. 1 may be implemented in a smart phone, whereas the circuitry outlined in FIG. 2 may be implemented into a laptop or personal computer.

Figure 3:
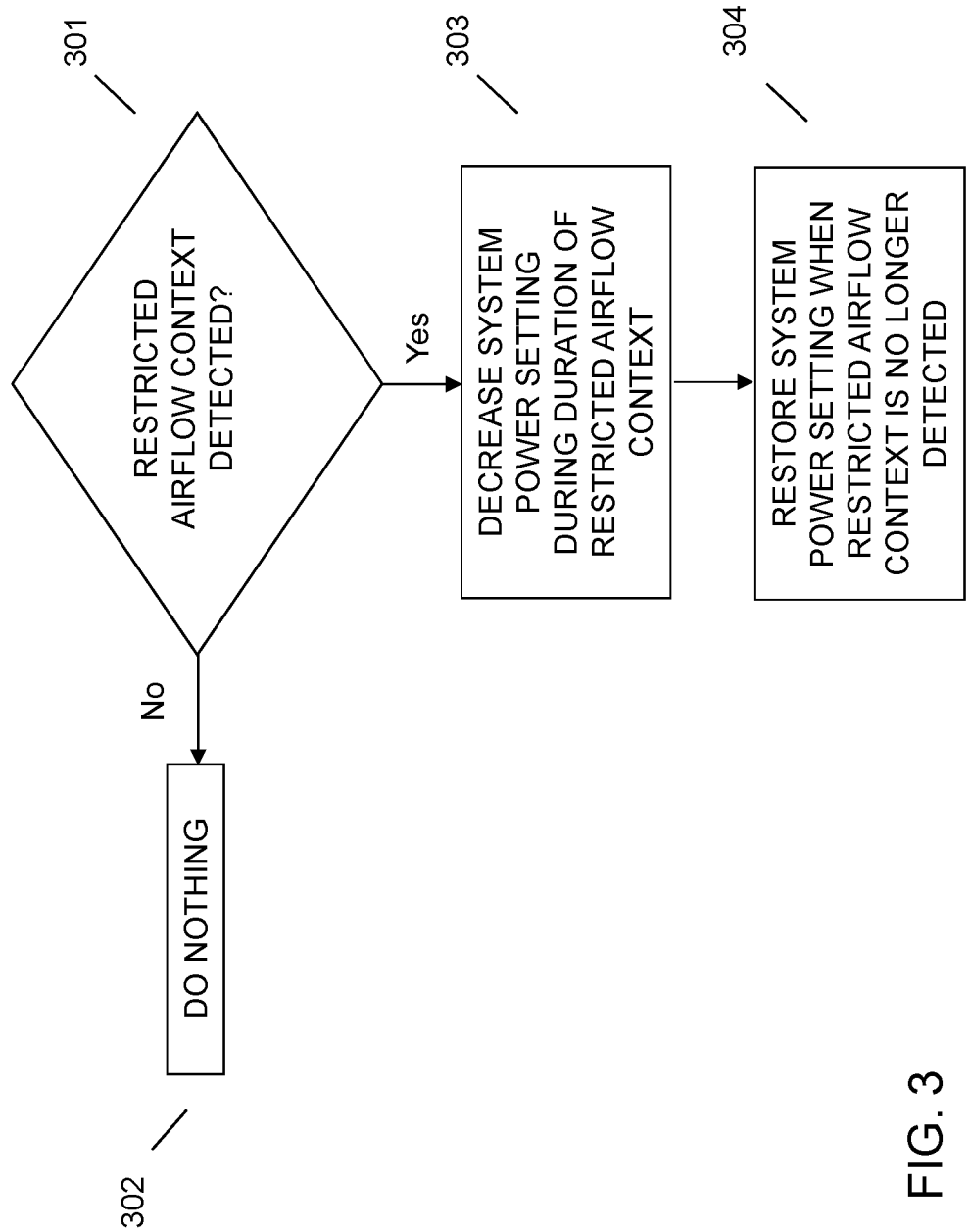
FIG. 3 illustrates an example method of preventing system overheating in a restricted workflow environment.

Referring now to FIG. 3, an embodiment provides a method for throttling system power when a device is a restricted airflow environment. At 301, an embodiment may detect that a device is in a restricted airflow environment. In an embodiment, the device may be virtually any type of mobile device, e.g., a smart phone, a tablet, a clamshell-type device such as a laptop computer or other hybrid device, and the like. In the context of this application, a restricted airflow environment may be one in which the air vents of a device are fully or partially blocked and/or may be one in which the integrated fan of a device is not able to properly circulate air to vent the device's internal components. Common restricted airflow environments include devices that are positioned inside bags or cases (e.g., to provide structural safety and convenience during transport, etc.) or devices positioned in user's clothing (e.g., a user's pocket, etc.).

In an embodiment, the detection of whether or not the device is in a restricted airflow environment may be facilitated by utilizing one or more available data metrics that may be identified via leveraging one or more sensors integrally or operatively coupled to the device, as further described below. In an embodiment, the detection may be achieved by only referencing one metric. Alternatively, in another embodiment, any number and/or combination of the metrics described below may be utilized in the detection process.

In an embodiment, one of the aforementioned metrics may correspond to device lid position data. Such data, if applicable, may identify a position of the lid of the device (e.g., is the lid open or closed with respect to a base portion of the device, etc.). Knowledge of this device characteristic may aid an embodiment in determining whether or not the device is in a restricted airflow environment. More particularly, users generally transport clamshell-type devices in a closed position (i.e., when the lid of the device is closed). Accordingly, determination that the lid of a device is closed may lend confidence to the system that it is in a portable mode and that the device may be experiencing a restricted airflow context. In an embodiment, this determination may be largely facilitated by identifying whether a device's lid-close sensor indicates that the lid of the device is open or closed. In the absence of a lid-close sensor, or simply to provide additional confirmation to the lid-close sensor's identifications, other characteristics of the device may be analyzed to aid in the determination. For example, an embodiment may identify whether various device components are active or inactive. More particularly, in a lid-closed position the keyboard and/or display screen of a clamshell-type device are inactivated. Additionally or alternatively, as another example, an embodiment may identify whether the device is connected to an external power source. Devices in transport are generally not simultaneously being charged so the absence of a connection to an external power source may add an additional consideration to the determination.

In an embodiment, another metric may correspond to device orientation data. Specifically, an embodiment may identify whether a device is vertically oriented about one of its edges. Knowledge of this information may aid an embodiment in determining whether or not the device is in a restricted airflow environment. More particularly, devices being transported (e.g., via carrying, etc.) are generally held vertically because it is easier for a user to carry the device this way. Additionally, devices being transported in a pocket or bag are also oriented vertically because that is how they best fit in the carrying medium. In an embodiment, the device's orientation may be deduced from data received from a conventional accelerometer integrated within the device. Specifically, the accelerometer data may be able to identify whether the device is positioned in a vertical orientation or not.

In an embodiment, another metric may correspond to z-axis cover compression data. Such data, if available, may identify whether a cover of a device is being compressed, even slightly, which may indicate that it is located in a bag or another type of enclosed environment (e.g., a user's pocket, etc.). Detection of compression may be facilitated in a variety of different ways. For instance, in an embodiment, a strain or deflection gauge may be positioned across the surface of the top and/or bottom cover of the device. In an embodiment, the strain gauge may manifest as a line or portion of conductive ink spread across a surface. In such a situation, as manipulations to the surface occur (e.g., via external surface pressure, etc.) the impendence of the ink may change, which may provide an indication to the system that compression is occurring. In another embodiment, the strain gauge may manifest as a metal strip placed on or within a device's cover. In such a situation, when the cover experiences compression the electrical properties of the metal strip may correspondingly change and this change may be detected by a system. In yet another embodiment, one or more piezoelectric sensors may be integrated into the device to utilize the piezoelectric effect to detect any changes in mechanical strain experienced by the cover of the device (i.e., from compression).

In an embodiment, another metric may correspond to the motion data of the device. In an embodiment, this motion data may correspond to ambulatory motion data (i.e., generated from a user's natural walking movements) or riding data (i.e., generated from the transport of the device in a vehicle or other medium). The presence of this data may provide an indication to the system it is being transported in some way. In an embodiment, the motion data may be detected from one or more accelerometers and/or gyroscopes integrated within the device. In an embodiment, the detected motion data of the device may be compared to an accessible database (e.g., stored locally on the device, stored remotely on another device or server, etc.) having stored motion patterns of devices experiencing ambulatory and/or vehicle-based motion. Responsive to determining that the detected motion of the device shares a predetermined level of similarity with the stored motions in the database, an embodiment may conclude that the device is undergoing motion.

Responsive to detecting, at 301, that the device is not experiencing a restricted airflow condition, an embodiment may, at 302, take no additional action. Conversely, responsive to detecting, at 301, that the device is experiencing a restricted airflow condition, an embodiment may, at 303, dynamically decrease a system power setting of the device. The decrease in system power may allow the device to maintain operating temperatures that meet bag-use comfort levels.

In an embodiment, the system power setting may be decreased automatically (i.e., without any additional user input). In an embodiment, the system power setting may be decreased by a predetermined amount. This predetermined amount may be originally established by a manufacturer of the device and may be later adjusted by a user of the device. In an embodiment, the decrease in system power may correspond to a disablement of one or more functions or capabilities on the device. More particularly, the relevant functions or capabilities that may be disabled are those that a user would not normally leverage during device transport anyway (e.g., a keyboard or display screen may be deactivated, etc.).

In an embodiment, the system power setting may be decreased only during duration of the detected restricted airflow condition. More particularly, responsive to detecting that the device is no longer experiencing the restricted airflow condition (e.g., by identifying that one or more of the foregoing metrics are no longer detectable, etc.), an embodiment may, at 304, restore the system power setting back to its original setting. In an embodiment, the restoration of the system power setting may occur dynamically and without the presence of any additional user input.

The various embodiments described herein thus represent a technical improvement to conventional methods of ensuring that a device operates safely in a restricted airflow environment. Using the techniques described herein, an embodiment may detect that a device is experiencing a restricted airflow context. This detection may be facilitated by an analysis of one or more device metrics (e.g., lid position data, device orientation data, cover compression data, motion data, etc.). Responsive to detecting that the device is experiencing the restricted airflow context, an embodiment may dynamically decrease a system power setting of the device during a duration of the restricted airflow context. Once an embodiment determines that the device is no longer experiencing the restricted airflow context, the system power setting may be dynamically restored. Such a method may enable a device to safely operate in a restricted airflow context while also not sacrificing performance when it is not experiencing restricted airflow.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, based on at least one metric, that an information handling device is experiencing a restricted airflow condition during transport of the information handling device;
   decreasing, responsive to the detecting, a system power setting of the information handling device during a duration of the restricted airflow condition, wherein the decreasing the system power setting comprises dynamically decreasing the system power setting by disabling at least one function of the device that would not be leveraged during the transport of the information handling device; and
   restoring, subsequent to detecting that the information handling device is no longer experiencing the restricted airflow condition; the system power setting.

2. The method of claim 1, wherein the information handling device in transport is a clamshell-type device.

3. The method of claim 1, wherein the at least one metric is detected by a sensor integrally coupled to the information handling device in transport.

4. The method of claim 1, wherein the at least one metric corresponds to lid position data associated with the information handling device in transport.

5. The method of claim 1, wherein the at least one metric corresponds to edge orientation data associated with the information handling device in transport.

6. The method of claim 1, wherein the at least one metric corresponds to cover compression data associated with the information handling device in transport.

7. The method of claim 6, wherein the cover compression data comprises strain data obtained from at least one of: impedance data from conductive ink spread across a surface of the information handling device, electrical property data from a metal strip integrated within the information handling device, and piezoelectric data obtained from a piezoelectric sensor integrated within the information handling device.

8. The method of claim 1, wherein the at least one metric corresponds to motion data associated with the information handling device in transport.

9. The method of claim 1, wherein the detecting comprises detecting that the information handling device in transport is positioned in an enclosed environment.

10. The method of claim 1, wherein the decreasing the system power setting comprises decreasing the system power setting by a predetermined amount.

11. An information handling device, comprising:
a processor;
a memory device that stores instructions executable by the processor to:
detect, based on at least one metric, that an information handling device is experiencing a restricted airflow condition during transport of the information handling device;
decrease, responsive to the detecting, a system power setting of the information handling device during a duration of the restricted airflow condition, wherein the decreasing the system power setting comprises dynamically decreasing the system power setting by disabling at least one function of the device that would not be leveraged during the transport of the information handling device; and
restore, subsequent to detecting that the information handling device is no longer experiencing the restricted airflow condition; the system power setting.

12. The information handling device of claim 11, wherein the information handling device in transport is a clamshell-type device.

13. The information handling device of claim 11, wherein the at least one metric is detected by a sensor integrally coupled to the information handling device in transport.

14. The information handling device of claim 11, wherein the at least one metric corresponds to lid position data associated with the information handling device in transport.

15. The information handling device of claim 11, wherein the at least one metric corresponds to edge orientation data associated with the information handling device in transport.

16. The information handling device of claim 11, wherein the at least one metric corresponds to cover compression data associated with the information handling device in transport.

17. The information handling device of claim 16, wherein the cover compression data comprises strain data obtained from at least one of: impedance data from conductive ink spread across a surface of the information handling device, electrical property data from a metal strip integrated within the information handling device, and piezoelectric data obtained from a piezoelectric sensor integrated within the information handling device.

18. The information handling device of claim 11, wherein the at least one metric corresponds to motion data associated with the information handling device in transport.

19. The information handling device of claim 11, wherein the instructions executable by the processor to decrease the system power setting comprise instructions executable by the processor to decrease the system power setting by a predetermined amount.

20. A product, comprising:
a storage device that stores code, the code being executable by a processor and comprising:
code that detects, based on at least one metric, that an information handling device is experiencing a restricted airflow condition during transport of the information handling device;
code that decreases, responsive to the code that detects, a system power setting of the information handling device during a duration of the restricted airflow condition, wherein the decreasing the system power setting comprises dynamically decreasing the system power setting by disabling at least one function of the device that would not be leveraged during the transport of the information handling device; and
code that restores, subsequent to the code that detects that the information handling device is no longer experiencing the restricted airflow condition; the system power setting.

* * * * *